United States Patent
Jones

(10) Patent No.: US 10,922,103 B2
(45) Date of Patent: *Feb. 16, 2021

(54) ELECTRONIC TRANSACTION METHOD AND APPARATUS

(71) Applicant: Maria Francisca Jones, Middlesex (GB)

(72) Inventor: Maria Francisca Jones, Middlesex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,437

(22) Filed: Jan. 17, 2020

(65) Prior Publication Data

US 2020/0150984 A1 May 14, 2020

Related U.S. Application Data

(63) Continuation of application No. 15/395,487, filed on Dec. 30, 2016, now Pat. No. 10,599,450.

(30) Foreign Application Priority Data

Dec. 31, 2015 (GB) ..................................... 1523166

(51) Int. Cl.
*G06F 9/451* (2018.01)
*G06F 16/954* (2019.01)
(Continued)

(52) U.S. Cl.
CPC ............ *G06F 9/451* (2018.02); *G06F 3/0482* (2013.01); *G06F 3/04817* (2013.01);
(Continued)

(58) Field of Classification Search
None
See application file for complete search history.

(56) References Cited

U.S. PATENT DOCUMENTS

| | | | |
|---|---|---|---|
| 5,060,135 A | 10/1991 | Levine et al. | |
| 5,442,795 A | 8/1995 | Levine et al. | |

(Continued)

FOREIGN PATENT DOCUMENTS

| | | | |
|---|---|---|---|
| GB | 2418504 A | 3/2006 | |
| WO | WO 2006/035214 A2 | 4/2006 | |

(Continued)

OTHER PUBLICATIONS

International Patent Application No. PCT/GB2016/054089; Int'l Written Opinion and the Search Report; dated Apr. 11, 2017; 9 pages.

(Continued)

*Primary Examiner* — Roy Y Yi
(74) *Attorney, Agent, or Firm* — BakerHostetler

(57) ABSTRACT

An electronic product transaction method at a merchant aggregator server operated by a merchant aggregator service provider, the method comprising generating and outputting an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server; receiving, from the user, a selection of a plurality of merchant options and a plurality of product options for the plurality of merchants using the interfaces for the purchase of the products; and generating and outputting a merchant interface to receive product data from the merchants to generate the product options for the merchant option for each merchant, including receiving code from the merchants to generate interfaces for at least one of the merchant options and the product options on the merchant aggregator server, and modifying the code (Continued)

to any links and functions in the code to operate on the merchant aggregator server.

54 Claims, 14 Drawing Sheets

(51) Int. Cl.
*G06Q 10/00* (2012.01)
*G06Q 30/06* (2012.01)
*G06F 40/134* (2020.01)
*G06F 3/0481* (2013.01)
*G06F 3/0482* (2013.01)
*G06Q 20/10* (2012.01)
*G06Q 20/40* (2012.01)

(52) U.S. Cl.
CPC .......... *G06F 16/954* (2019.01); *G06F 40/134* (2020.01); *G06Q 10/00* (2013.01); *G06Q 20/10* (2013.01); *G06Q 20/405* (2013.01); *G06Q 30/0601* (2013.01)

(56) References Cited

U.S. PATENT DOCUMENTS

| | | |
|---|---|---|
| 5,481,665 A | 1/1996 | Okada et al. |
| 5,838,326 A | 11/1998 | Card et al. |
| 6,678,685 B2 | 1/2004 | McGill et al. |
| 6,924,827 B1 | 8/2005 | Gulati et al. |
| 7,036,082 B1 | 4/2006 | Dalrymple et al. |
| 7,356,490 B1 | 4/2008 | Jacobi et al. |
| 7,912,852 B1 | 3/2011 | McElroy |
| 8,055,638 B2 | 11/2011 | Schechter et al. |
| 8,326,859 B2 | 12/2012 | Paek et al. |
| 8,407,613 B2 | 3/2013 | Hope |
| 9,294,562 B2 | 3/2016 | Gong |
| 9,483,565 B2 | 11/2016 | Tomkins et al. |
| 2002/0049637 A1 | 4/2002 | Harman et al. |
| 2002/0147660 A1 | 10/2002 | Indence |
| 2003/0023594 A1 | 1/2003 | Ramamurthi |
| 2003/0065562 A1 | 4/2003 | Matsui et al. |
| 2003/0074278 A1 | 4/2003 | Keohane et al. |
| 2003/0126461 A1 | 7/2003 | Barker et al. |
| 2003/0210279 A1 | 11/2003 | Masuda |
| 2004/0019530 A1 | 1/2004 | Broussard et al. |
| 2004/0027383 A1 | 2/2004 | Jaeger et al. |
| 2004/0143650 A1 | 7/2004 | Wollowitz |
| 2004/0153385 A1 | 8/2004 | Allibhoy et al. |
| 2004/0179430 A1 | 9/2004 | Bahar et al. |
| 2004/0225968 A1 | 11/2004 | Look et al. |
| 2004/0267593 A1 | 12/2004 | Sammons et al. |
| 2005/0132296 A1 | 6/2005 | Milic-Frayling et al. |
| 2006/0122916 A1 | 6/2006 | Kassan |
| 2006/0203620 A1 | 9/2006 | Bedingfield |
| 2006/0259867 A1 | 11/2006 | Watson et al. |
| 2006/0282408 A1 | 12/2006 | Wisely et al. |
| 2006/0287985 A1 | 12/2006 | Castro et al. |
| 2007/0061308 A1 | 3/2007 | Hartwell et al. |
| 2007/0118434 A1 | 5/2007 | Mengerink et al. |
| 2007/0174286 A1 | 7/2007 | Seitz et al. |
| 2007/0174777 A1 | 7/2007 | Finley et al. |
| 2007/0260591 A1 | 11/2007 | Ahi et al. |
| 2008/0034317 A1 | 2/2008 | Fard et al. |
| 2008/0059570 A1 | 3/2008 | Bill |
| 2008/0215973 A1 | 9/2008 | Zalewski et al. |
| 2009/0132388 A1 | 5/2009 | Omori et al. |
| 2009/0158200 A1 | 6/2009 | Palahnuk et al. |
| 2009/0228819 A1 | 9/2009 | McDermott |
| 2009/0240610 A1 | 9/2009 | Barsade |
| 2010/0287510 A1 | 11/2010 | Cragun |
| 2011/0239117 A1 | 9/2011 | Sutton et al. |
| 2011/0252346 A1 | 10/2011 | Chaudhri |
| 2011/0264681 A1 | 10/2011 | Kimberlin et al. |
| 2011/0267182 A1 | 11/2011 | Westerinen et al. |
| 2011/0289530 A1 | 11/2011 | Dureau et al. |
| 2012/0078731 A1 | 3/2012 | Linevsky et al. |
| 2013/0074014 A1 | 3/2013 | Ouyang et al. |
| 2013/0204862 A1 | 8/2013 | Marchiori |
| 2013/0211938 A1 | 8/2013 | Allaqaband |
| 2013/0218716 A1 | 8/2013 | Godsey et al. |
| 2013/0249947 A1 | 9/2013 | Reitan |
| 2014/0123022 A1 | 5/2014 | Lee et al. |
| 2014/0279749 A1 | 9/2014 | Vogt |
| 2015/0020005 A1 | 1/2015 | Allani |
| 2015/0237147 A1 | 8/2015 | Sundaresan |
| 2015/0332230 A1 | 11/2015 | Gaines et al. |
| 2015/0339707 A1 | 11/2015 | Harrison et al. |
| 2015/0356643 A1 | 12/2015 | Kohm et al. |
| 2016/0139776 A1 | 5/2016 | Donahue et al. |
| 2016/0320937 A1 | 11/2016 | Zhou |
| 2017/0098256 A1 | 4/2017 | Long et al. |
| 2017/0098284 A1 | 4/2017 | Schneider |
| 2017/0154304 A1 | 6/2017 | Aryeetey et al. |
| 2017/0192798 A1 | 7/2017 | Jones |
| 2017/0192993 A1 | 7/2017 | Rakowski et al. |
| 2017/0193507 A1 | 7/2017 | Jones |

FOREIGN PATENT DOCUMENTS

| | | |
|---|---|---|
| WO | WO 2007/033354 A2 | 3/2007 |
| WO | WO 2014/098748 A1 | 6/2014 |

OTHER PUBLICATIONS

International Patent Application No. PCT/GB2016/054092; Int'l Written Opinion and the Search Report; dated Apr. 11, 2017; 10 pages.

Singapore Patent Application No. 11201805520U; Written Opinion; dated Dec. 11, 2018; 5 pages.

Liu et al.; Continual Queries for Internet Scale Event-Driven Information Delivery; IEEE Transactions on Knowledge and Data Engineering; vol. 11 No. 4; Jul./Aug. 1999; p. 610-628.

Garcia-Molina et al.; "Database Systems and the Internet"; Database Systems the Complete Book, $2^{nd}$ Edition; 2008; 43 pages.

International Patent Application No. PCT/GB2018/051618; Int'l Search Report and the Written Opinion; dated Oct. 2, 2018; 14 pages.

International Patent Application No. PCT/GB2018/051619; Int'l Search Report and the Written Opinion; dated Aug. 7, 2018; 13 pages.

"Desktop metaphor"; https://en.wikipedia.org/w/index.php?title=Desktop_metaphor&oldid=742314706; Wikipedia; accessed Sep. 20, 2018; 4 pages.

International Patent Application No. PCT/GB2018/051620; Int'l Search Report and the Written Opinion; dated Oct. 1, 2018; 14 pages.

Joe Danziger; "Building a Drag-and-Drop Shopping Cart with AJAX"; SYS-CON Media Inc.; ©2008; 4 pages.

Sarah Bidigare; "Information Architecture of Shopping Cart"; Best Practices for the Information Architectures of E-Commerce Ordering Systems; Argus Associates, Inc.; May 2000; 19 pages.

Thalheim et al.; "The use of metaphorical structures for internet sites"; Data & Knowledge Engineering 35; vol. 35; 2000; p. 161-180.

International Patent Application No. PCT/GB2018/051617; Int'l Search Report and the Written Opinion; dated Dec. 19, 2018; 24 pages.

Singapore Patent Application No. 11202000028Y; Search Report Written Opinion; dated Nov. 3, 2020; 8 pages.

ELECTRONIC TRANSACTION METHOD AND APPARATUS

RELATED APPLICATIONS

This application is a continuation of U.S. patent application Ser. No. 15/395,487 having a filing date of Dec. 30, 2016, which claims priority to United Kingdom patent application number 1523166.5 filed on Dec. 31, 2015, the contents of which are hereby incorporated in their entirety by reference.

FIELD OF THE INVENTION

The present invention relates to an electronic transaction method and apparatus and in one aspect the present invention relates to an electronic transaction method and apparatus to aggregate or facilitate transactions by a user for a plurality of products from a plurality of merchants using a common aggregate transaction.

BACKGROUND INFORMATION

Ecommerce has become prevalent in recent years and most merchants have their own web site offering their products (goods and services) for sale, rent or hire. When a user wishes to visit a plurality merchants' web sites to purchase products, they must at each web site select the products that they wish to purchase to put them in the 'basket' and complete the purchase on one web site before moving to the next to make purchases of products on that web site in a similar manner.

This operation requires a user to log into multiple web sites and enter details for multiple transactions from multiple merchants. This is a tedious operation when a user wishes to purchase products from large number of merchants.

SUMMARY OF THE INVENTION

One aspect provides electronic product transaction method at a merchant aggregator server operated by a merchant aggregator service provider, the method comprising generating and outputting an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server; receiving, from the user, a selection of a plurality of merchant options and a plurality of product options for the plurality of merchants using the interfaces for the purchase of the products; and generating and outputting a merchant interface to receive product data from the merchants to generate the product options for the merchant option for each merchant, including receiving code from the merchants to generate interfaces for at least one of the merchant options and the product options on the merchant aggregator server, and modifying the code to any links and functions in the code to operate on the merchant aggregator server Another aspect of the invention provides a merchant aggregator server operated by a merchant aggregator service provider, the merchant aggregator server comprising at least one processor; and a memory storing instructions, which instructions being executable by the at least one processor to: generate and output an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server; receive, from the user, a selection of a plurality of merchant options and a plurality of product options for the plurality of merchants using the interfaces for the purchase of the products; and generate and output a merchant interface to receive product data from the merchants to generate the product options for the merchant option for each merchant, including receiving code from the merchants to generate interfaces for at least one of the merchant options and the product options on the merchant aggregator server, and modifying the code to any links and functions in the code to operate on the merchant aggregator server.

Another aspect of the invention provides an electronic product transaction method at a merchant aggregator server operated by a merchant aggregator service provider, the method comprising generating and outputting an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server; receiving, from the user, a selection of a plurality of merchant options and a plurality of product options for the plurality of merchants using the interfaces for the purchase of the products; and generating and outputting a merchant interface to receive product data from the merchants to generate the product options for the merchant option for each merchant, including receiving selections of templates using the merchant interface and generating interfaces for the product options using the selected templates.

Another aspect of the invention provides a merchant aggregator server operated by a merchant aggregator service provider, the merchant aggregator server comprising at least one processor; and a memory storing instructions, which instructions being executable by the at least one processor to generate and output an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server; receive, from the user, a selection of a plurality of merchant options and a plurality of product options for the plurality of merchants using the interfaces for the purchase of the products; and generate and output a merchant interface to receive product data from the merchants to generate the product options for the merchant option for each merchant, including receiving selections of templates using the merchant interface and generating interfaces for the product options using the selected templates.

Another aspect of the invention provides a carrier medium or a storage medium carrying code executable by a processor to carry out the electronic product transaction method.

DETAILED DESCRIPTION

Figure 1:
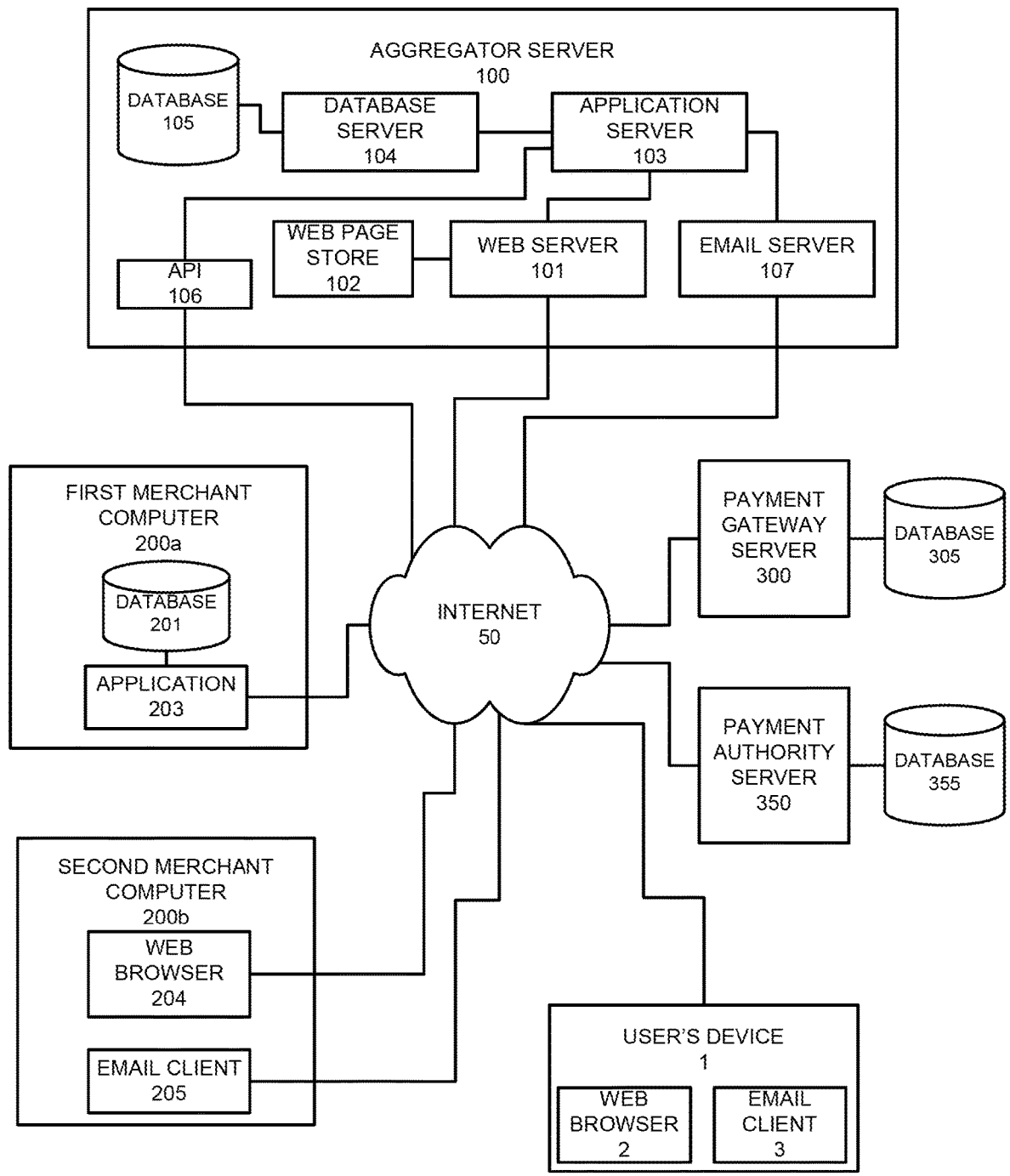
FIG. 1 is a schematic diagram illustrating a transaction system according to one embodiment.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

In the following embodiments, like components are labelled with like reference numerals.

In the following embodiments, data is described as being stored in at least one database. The term database is intended to encompass any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. A "file system" may control how data is stored and/or retrieved (for example, a disk file system like FAT, NTFS, optical discs, etc., a flash file system, a tape file system, a database file system, a transactional file system, a network file system, etc.). For simplicity, the disclosure is described herein with respect to databases. However, the systems and techniques disclosed herein may be implemented with file systems or a combination of databases and file systems.

In the following embodiments, the term data store is intended to encompass any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

A generalized embodiment provides an electronic product transaction method at a merchant aggregator server operated by a merchant aggregator service provider. An interface, such as a web interface or web page, is generated and output to a user. The interface comprises a plurality of selectable merchant options, such as web links. Each merchant option comprises a link to a plurality of selectable product options for a respective merchant. Each product option comprises information on a product offered for sale, rent or hire by the respective merchant. Thus, the merchant aggregate server hosts an interface, which can in one embodiment comprise web pages or a web site for each of a plurality of merchants so that each merchant can offer their products for sale, rent or hire from one common site. A user can make a selection of a plurality of merchant options and a plurality of product options for the plurality of merchants. The merchant aggregate server generates transaction data identifying the plurality of merchants and the plurality of products. The transaction data includes data on commission payable to the merchant aggregator service provider. When an instructions from the user to pay for the selected products, the transaction data is transmitted to a remote payment server to authorize and make payments for the products from the user to the plurality of merchants and payment of the commission to the merchant aggregator service provider.

Thus, in one embodiment, the transaction data comprises aggregate transaction data for a plurality of transactions with a plurality of merchants and a single payment is authorized by a user to make payments to the plurality of merchants.

In one embodiment, the transaction data includes data on a method of payment for each of the plurality of merchants. In other words, the merchants can supply the aggregation service provider with payment information specifying how they are to be paid for the products that they offer for sale, rent or hire on the merchant aggregator server and this can be supplied as part of the transaction data to a payment server to receive a single payment from the user and authorize and make multiple payments to the merchants for the products purchased by the user in the transaction.

In one embodiment, an authorization for the transaction can be received from the payment server, and the status of the transaction is updated from open to closed in response to receipt of the authorization. In this way, the transaction data can comprise data on products in an as yet unpurchased state, commonly termed a 'basket'. Once the transaction is authorized, the basket is emptied and the products move to a purchased state. This is represented as a closed transaction state in the transaction data.

In one embodiment, the information on the product offered for sale, rent or hire by each merchant includes a quantity of the product available from the merchant, and the quantity of the product available from the merchant can be updated.

In another embodiment, a merchant server for each of the plurality of merchants is notified of the quantity to update inventory at the merchant. This ensures that products are only offered for sale, rent or hire if there is inventory available to meet the order.

In one embodiment, a merchant server for each of the plurality of merchants can be notified of the transaction data to update inventory data at the merchant server. This data can also be used to enable the merchant to initiate delivery of the product from their warehouse or store.

In one embodiment, the interface allows a user to make selections of merchant options to enter merchant interface areas in which the product options are available for selection by the user, and to select product options for each of the plurality of merchant's products to generate the transaction data by displaying a common basket option in each merchant interface area and allowing a user to select to add a product for each merchant to the common basket.

In one embodiment, a merchant interface is generated and output to receive product data from the merchants to generate the product options for the merchant option for each merchant. In one embodiment, templates can be selected using the merchant interface to generate interfaces for the product options and in one embodiment the merchant interface is provided by an API on the merchant aggregator server, to which an application on a merchant server connects.

Thus, the merchant's interface with the merchant aggregator server to set up and maintain their web pages or web site hosted on the aggregator server. The merchant web pages can be created by the merchant using code or templates made available on the aggregator server. Alternatively, the merchant could upload their own web pages (HTML code) to the aggregator server, with the code modified to ensure that the links and functions will operate hosted on the aggregator server. The merchant interface can also be used to inform the merchants of transactions so that they can update their inventory and synchronize their inventory with the product quantity data stored on the merchant aggregator server. In this way, if the merchant's inventory is reduced via sales through other channels, or if the stock is replenished, the drop or increase in stock of products can be reflected accurately on the merchant aggregator server.

The user interface and merchant interface can, in one embodiment, be provided as a conventional web site having a displayed output and a pointer device and keyboard input by a user. In alternative embodiments, the interfaces can be provided by any form of output e.g. visual, or audible, and any form of input such as keyboard, touch screen, pointer device (such as a mouse, trackball, trackpad, or pen device), audio recognition hardware and/or software to recognize a sounds or speech from a user, gesture recognition input hardware and/or software, etc.

In one embodiment, the user interface can be provided using the method disclosed in co-pending application Ser. No. 15/395,343, filed Dec. 30 2016, entitled "USER INTERFACE METHOD AND APPARATUS", by the same applicant and inventors, the content of which is hereby incorporated in its entirety.

In the embodiments, the term products encompasses any product sold, hired or rented by a merchant, which can include goods and services.

Specific embodiments will now be described with reference to the drawings.

An embodiment will be described with reference to FIG. 1. FIG. 1 illustrates a transaction system according to one embodiment.

A merchant aggregator server 100 is provided connected to a network such as the internet 50. The merchant aggregator server 100 provides a merchant aggregation service to a plurality of users to purchase products from a plurality of merchants using a single aggregated transaction (or common basket) with a single payment from the user split into multiple payments to the merchants and a commission to the aggregation service by a payment function.

In this embodiment, only a single user is represented by a single user's device 1. However, multiple users will in practice use multiple users' devices. The device 1 can comprise any type of computing or processing machine, such as a personal computer, a laptop, a tablet computer, a personal organizer, a mobile device, smart phone, a mobile telephone, a video player, a television, an audio player, a multimedia device, personal digital assistant, etc. The user's device 1 is provided with a web browser 2 to access a web server 101 at the aggregator server 100 and an email client 3, such as Microsoft Outlook™ to receive an email when the aggregated transaction is completed from an email server 107 of the aggregator server 100.

In this embodiment, two merchants are represented by two merchants' computers 200a and 200b. The first merchant's computer 200a is connected to the internet 50 and includes an application 203 running on the computer accessing a database 201 of the merchant's products. The application 203 can be used to access an API 106 at the aggregator server 100. The first merchant's computer 200a is hence a large merchant with a significant number of products to list on a web site created on the aggregator server 100. Data on the products is stored in the database 201 and can be uploaded to a database 105 at the aggregator server 100 when creating the web site or web pages for the first merchant. The product data can be uploaded in a defined format, such as in XML according to a defined XML schema to enable the data to be readily recognized by the aggregator server 100. The API 106 and the application 203 enable data to be passed back to the first merchant's computer 200a. Such data can include transaction data and product quantity data. The transaction data enables the merchant to determine where to deliver the product and as soon as the transaction data is received, the merchant can start the delivery process. Alternatively, the merchant can await payment from a payment authority before starting fulfilment of the order in case there is some problem with the payment process.

A second merchant's computer 200b is connected to the internet 50 and only includes a web browser 204 and email client 205. Thus, this merchant does not have an application and can only access the aggregator server 100 via the web browser 101. The web server 101 can provide a portal with an appropriate merchant login process to enable the second merchant to user the second merchant's computer 200b to access a merchant web site or merchant web page administrator area to enable the second merchant to upload product data and set up the merchant's web site or web pages for ecommerce. The second merchant's computer 200b is also provided with an email client 205, such as Microsoft Outlook™ to receive an email when the aggregated transaction is completed from an email server 107 of the aggregator server 100. The second merchant can thus manually update any internal records on inventory kept by the second merchant.

In this embodiment, the payment function is provided by a payment gateway server 300 operated by a payment gateway such as PayPal™ which is separate from a payment authority server 350, operated by a financial institution of credit card company. The payment gateway server 300 is provided with a database 305 containing data required to provide the payment gateway service, such as user account information, which includes user information, user login information, use transaction history, etc. The payment authority server 350 is provided with a database 355 containing account information for users and merchants. This embodiment assumes that there is a single payment authority. There may be more than one required to complete a transaction since a merchant may not have an account with the payment authority associated with the payment authority server 350. In this case, the payment authority can make a payment to an intermediary payment authority.

In an alternative embodiment, a single server could be used that provides the functionality of the payment gateway and the payment authority. In both embodiments, the payment functions are separate from and distinct to the aggregator server and operations. It is provided by a third party, or two third parties.

The aggregator server 100 comprises a web server 101 connected to the internet50. The web server 101 is connected to a web page store 102 storing static web pages and templates required for the web server to generate and serve web pages to the web browser of the second merchant's computer 200*b* and the user's device 1. An application server 103 is provided connected to the web server 101 and the application server act to generate dynamic web pages for the web server and perform other functions of the aggregator service. A database server 104 is provides connected to the application server 103 to provide the application server with access to a database 105 containing merchant data, product data, and transaction data, as described in more detail below.

The aggregator server 100 is also provided with an email server connected to the internet 50 and controller by the application server 103 to generate and send emails to the second merchant's computer 200*b* and the user's device 1 when an aggregate transaction is completed.

The data stored in the database 105 in the aggregator server 100 includes the following data:

Merchant Data

This data is unique for each merchant and is identified by a merchant identifier.
  Merchant ID
  Name, logo etc.
  Username and password for the merchant to login to their administrator section hosted on the aggregator server 100 to set up and manage their web site or web pages hosted on the aggregator server 100
  Merchant description/information
  Contact details and email address
  Merchant rating—based on the merchant's popularity and/or performance in previous transactions
  Payment information—merchant's payment gateway and/or authority account details to enable payment to be made to them
  Commission ID
  Currency—the currency accepted by the merchant Product Data This data is unique for each product and is identified by a product identifier.
  Product ID
  Merchant ID—the merchant to which the product belongs
  Quantity—the quantity of the product available for purchase
  Category IDs—the categories (type of product) that the product belongs to
  Commission ID—each product can have a different commission applied to it
  Product description
  Image/video ID for the product
  Price data for the product Commission Data This data defines unique commission data that can be applied to each product or category of products and is identified by a commission identifier.
  Commission ID
  Percentage or fixed commission
  Commission value e.g. 2% or £1.00

Product Category Data

This data defines unique category data to group together types of products and is identified by a category identifier.
  Category ID
  Commission ID
  Category description Web Pace Data This data defines unique properties of a web page that displays product options, which are selectable by a user. A page identifier identifies the web page data.
  Page ID
  Merchant ID
  Page data (e.g. skin data)
  Meta description
  Template ID
  Product IDs Template Data This data defines templates that can be used for the design of a web page. This enables a merchant to use templates to build the web pages hosted by the aggregator server. The templates are uniquely identified by a template identifier.
  Template ID
  Template data User Data This data is unique for each user and is identified by a user identifier.
  User ID
  Name
  Contact details and email address
  Username and password for the user to login to the aggregator server
  Currency—a user's preferred currency for transactions
  Language—a user's preferred language
  Profile picture
  Preferred payment authority including public login data (e.g. username but not password)
  Favourites—a users recorded favourite products or merchants
  History data—transaction history data and user product viewing history data Merchant Aggregator Data
  Aggregator account details for payment—aggregator's payment gateway and/or authority account details Aggregate Transaction Data This data is unique for an aggregate transaction performed by a user in a session for a plurality of products from a plurality of merchants and is identified by an aggregate transaction identifier.

Aggregate transaction ID

Session ID—this is generated at the start of a session by a user and used to ensure that the aggregate transaction identifier is only usable for a single session by a user User details and ID—the user details are stored separately to the user ID in case the user changes their details after the transaction Date and time of the transaction—this can be a start time and/or an end time Total value of the transaction Currency of the transaction Commission total to be paid to the aggregator service provider for the aggregated transaction Transaction status—open or closed. The transaction is open until the transaction payment is approved by the payment authority Live transaction ID—this is the transaction ID issued by the payment authority for the transaction Transaction Data This data is unique for each merchant and can contain transaction data for a plurality of products from the merchant and a total due to the merchant. The transaction data is uniquely identified by a transaction identifier.

Transaction ID

Merchant details and ID—the merchant details are stored separately to the merchant ID in case the merchant changes their details after the transaction Product details and IDs—the product details are stored separately to the product ID in case the merchant changes the product details after the transaction Aggregate transaction ID Date and time of the transaction with the merchant—this can be a time different to the aggregate transaction time but must be a time lying between a start and end time for an aggregate transaction.

Quantity of products—this is the number of each product ordered and is linked to the product IDs listed above in the transaction data.

Price of products—this is the price of each product ordered and is linked to the product IDs listed above in the transaction data.

Currency for the transaction

Exchange rate to be applied to the transaction

Total value to merchant—total for all products of (price of product×quantity)+delivery cost Delivery data—estimated date and cost for each product (each product may have a different delivery date)

In order for a user to use the aggregator server 100, a user can access a sign up web page an enter user data. The user can also set up an account with the payment gateway operating the payment gateway server 300. Alternatively, a user can access the aggregator server 100 as a guest user by entering temporary details that are not stored in a user account permanently.

In order to set up the merchants' web sites or web pages, each merchant can sign up to the aggregator payment service and enter merchant data. Alternatively, a merchant can access the aggregator server 100 as a guest user by entering temporary details that are not stored in a user account permanently. The merchant can then login to a web portal to access an administrator area or download and install an application 203 to access the API 106. The merchant can upload product data, using for example XML, and they can design and save web pages for their products using available templates and web data e.g. skin data. They can also upload style data such as brand and logo data to customize the web pages. The product data and web page data is then stored in the database 105. The merchant can also upload their own web pages modified to ensure that the web page navigation by a customer seeking to purchase products stays on the pages hosted by the aggregator server for the purposes of aggregation of the transactions/purchases from multiple merchants.

The operation of the system of FIG. 1 for the transaction process according to one embodiment will now be described with reference to the schematic diagrams of user interfaces of FIGS. 2*a* to 2*j* generated through a transaction process of the flow diagram of FIG. 3.

Figure 2A:
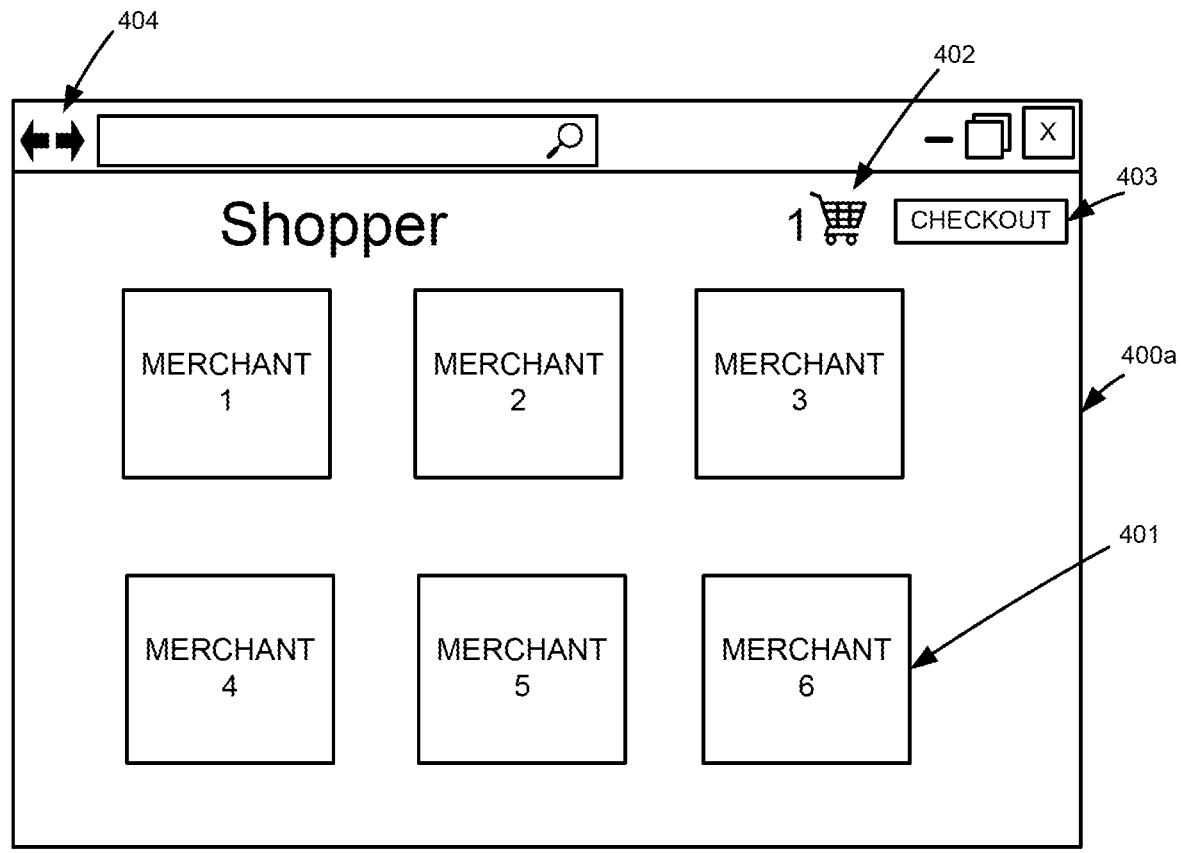
FIGS. 2a to 2j are schematic diagrams of user interfaces generated through a transaction process according to one embodiment.
Figure 3:
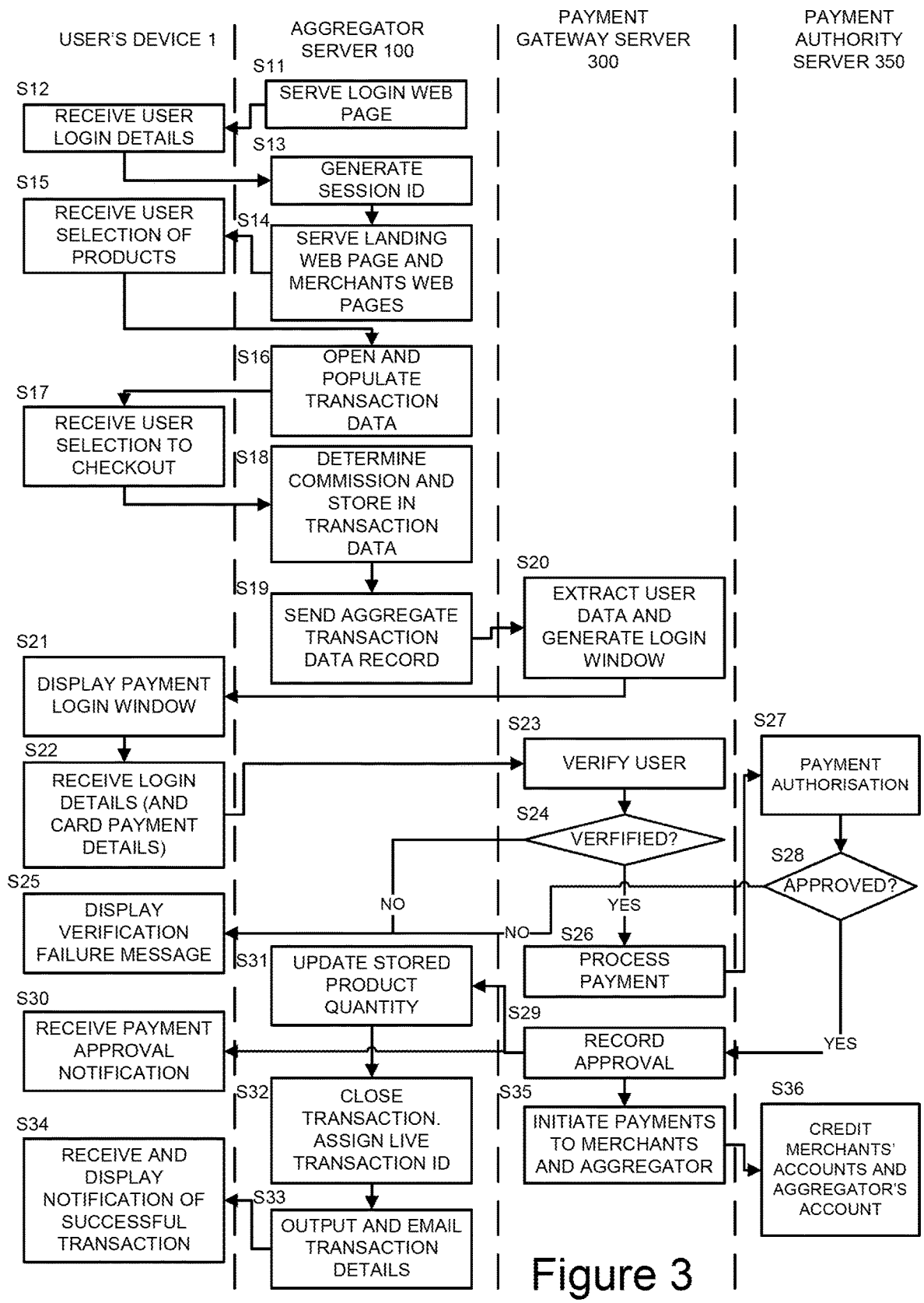
FIG. 3 is a flow diagram of a transaction process according to one embodiment.

In step S11 of FIG. 3 the web server 101 of the aggregator server 100 serves a login web page to the user's device 1, which is rendered and displayed by the web browser 2 so as to receive user login details (step S12) that are sent to the aggregator server 100. The web server 101 generates a session identifier in step S13 that is recorded in the database 105 by the application server 103 using the database server 104 of the aggregator server 100. The web server 101 of the aggregator server 100 then in step S14 serves a landing web page which is rendered and displayed as the landing web page 400*a* shown in FIG. 2*a*.

The landing web page 400*a* includes a plurality of merchant options 401 comprising links that are selectable HTML links to merchant product options (web pages). The landing page includes a basket 402 showing how many products are in the basket (in an open transaction status), which in the illustrated embodiment, it is one, and a checkout option 403 selectable by a user to checkout or complete a transaction for the products in the basket.

The browser interface is also provided with conventional back and forward selectable options 404 for web page navigation.

Figure 2B:
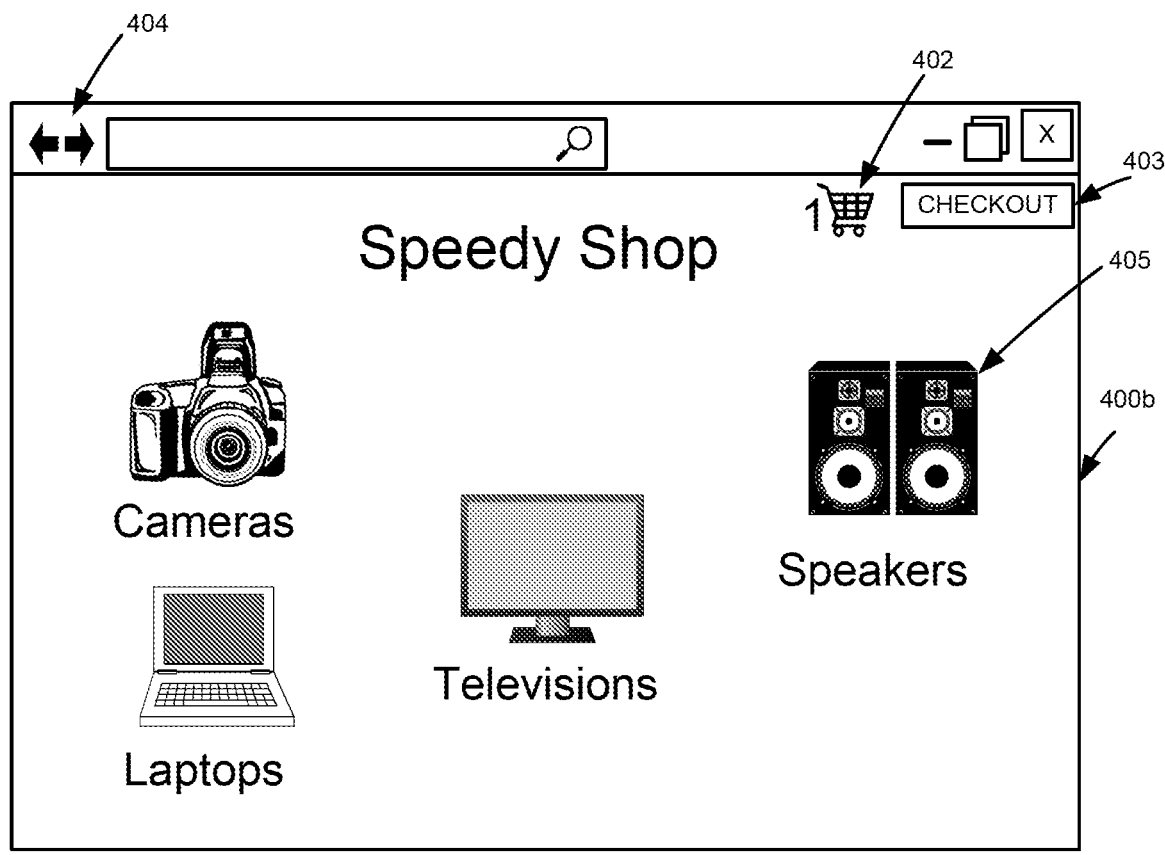

FIG. 2*b* illustrates the browser interface after selection by a user of a merchant option, which in this example is the merchant "Speedy Shop". The Speedy Shop merchant web page 400*b* is displayed showing categories of products available for purchase from the merchant. In this example, there are 4 categories of products available for selection, namely: Cameras, Laptops, Televisions, an Speakers. Each category icon 405 is selectable by a user to display a web page with individual products available for purchase from the merchant in the selected category. The merchants product category page includes a basket 402 showing how many products are in the basket (in an open transaction status), which in the illustrated embodiment, it is one, and a checkout option 403 selectable by a user to checkout or complete a transaction for the products in the basket.

Figure 2C:
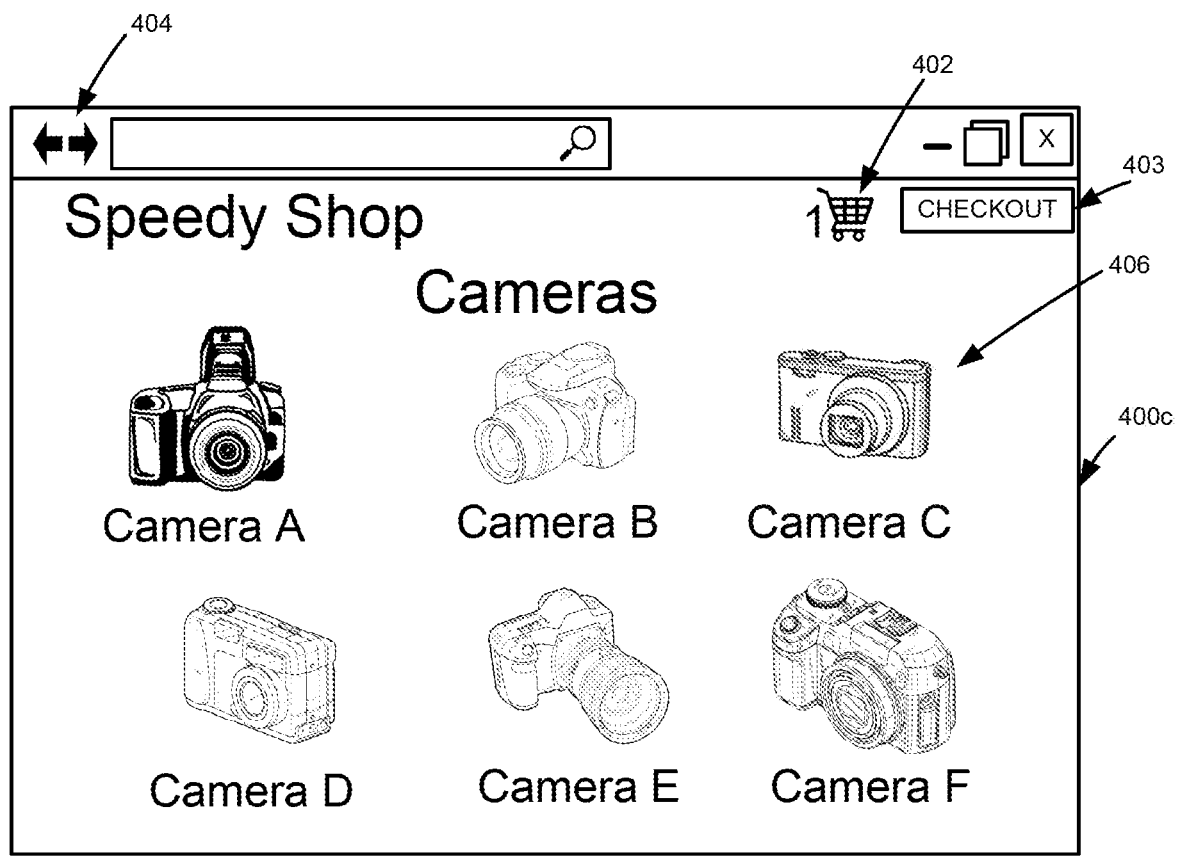

FIG. 2*c* illustrates the browser interface after selection by a user of a product category option, which in this example is the category "Cameras". The product list web page 400*c* is displayed with selectable product options 406 as selectable links to select to view more information and purchase a camera. The product category list page includes a basket 402 showing how many products are in the basket (in an open transaction status), which in the illustrated embodiment, it is one, and a checkout option 403 selectable by a user to checkout or complete a transaction for the products in the basket.

Figure 2D:
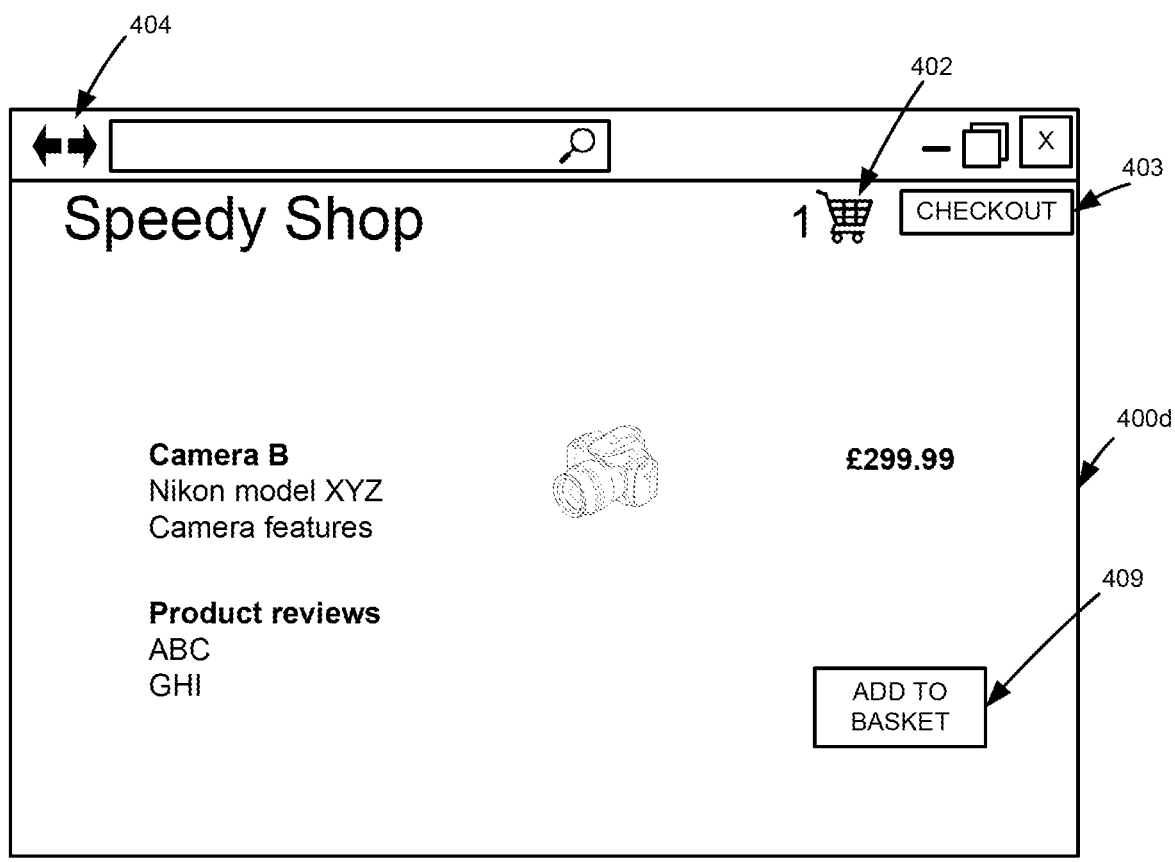

FIG. 2*d* illustrates the browser interface after selection by a user of camera B as a product option. The product web page 400*d* is displayed to display details about the selected product option and a selectable "Add to basket" option 409 is displayed to enable the selection of the product as added to the transaction data or added to the basket. Before the user makes the selection, the basket 402 still shows only one item in the basket.

In step S15 in the flow diagram of FIG. 3, a user selection of a product is received and in step S16 transaction data is opened and populated. In the example illustrated in FIG. 2d, the transaction is already open due to a prior selection and placement of a product in the basket 402.

Figure 2E:
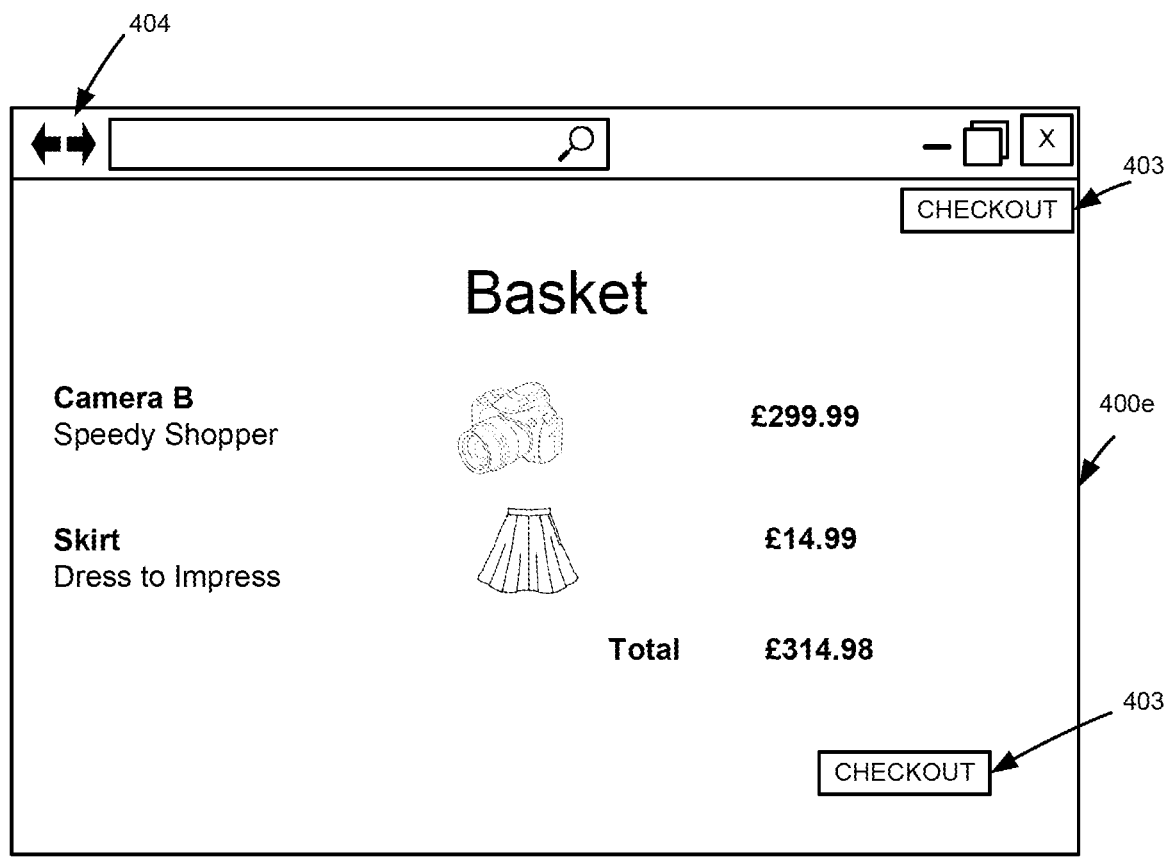

FIG. 2e illustrates the browser interface after selection by a user to view the basket by selection of the basket option 402 in any of FIGS. 2a to 2d. A basket web page 400e is displayed listing the selected products and displaying a checkout option 403 where the add to basket option was previously displayed. In this example, the basket shows the prior selected product that was indicated as being in the basket in FIGS. 2a to 2d, which is a skirt from the merchant "Dress to Impress". The most recently selected product, camera B is also shown along with a transaction total. The basket display thus represents an aggregate transaction from two merchants, with the transaction data still in an open status.

Figure 2F:
Figure 2G:
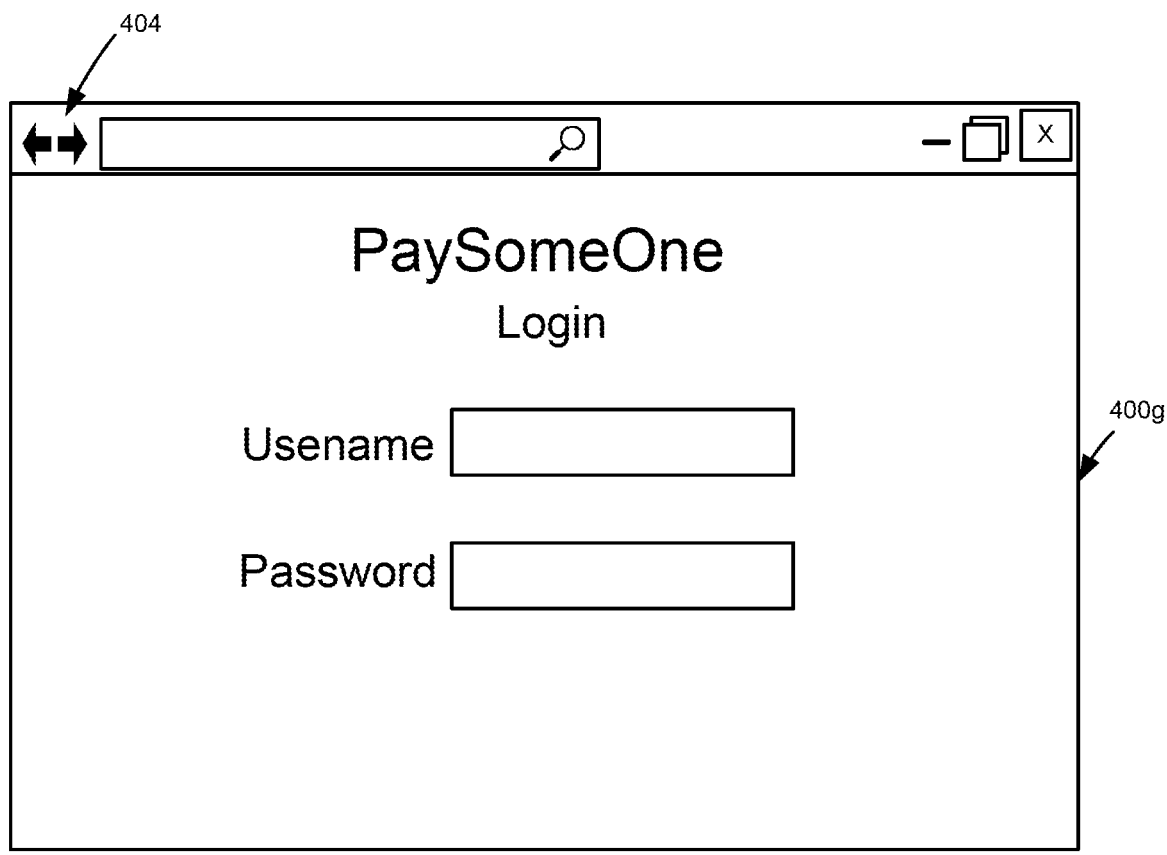

In step S17 of FIG. 3, a user selection to checkout by the selection of option 203 is received and the browser interface of FIG. 2f is displayed. A checkout web page 400f is displayed with the products listed along with details of the products and other information such as the delivery date and cost, and a selection option for the user to select to pay for the aggregate transaction. When the user selects to pay for the transaction to complete the checkout operation, in step S18 of FIG. 3, the aggregate server 100 determines the commission payable to the aggregate service provider and stores this in the aggregate transaction data. In step S19, the aggregate server 100 sends the aggregate transaction data record to the payment gateway server 300 and in step S20 the payment gateway server 300 extracts the user data and generates a login window, which is sent to the web browser 2 of the user's device 1. In step S21 the payment login window 400g is displayed by the web browser 2 of the user's device 1 as illustrated in FIG. 2g. In this example, the payment gateway service provider is "PaySomeOne". In step S22, the user's device 1 received a user's login details for the payment gateway service. In an alternative embodiment, the user may wish to enter other payment information, such as credit card details to pay the payment authority directly.

In step S23, the payment gateway server 300 verifies the authenticity of the user and if the user is not verified (step S24), a message is sent back to the user's device 1 for display by the browser 2 in step S25 to inform the user that the verification has failed. If the verification has failed, the transaction can be amended to a closed state but with no live transaction ID. This moves the products out of the basket since the basket represents products in an open transaction status. A transaction that is closed, with no live transaction ID identifies the transaction as a failed transaction. Alternatively, the aggregate transaction ID can include a transaction failed flag which is set when the transaction fails.

Figure 2H:
Figure 2I:
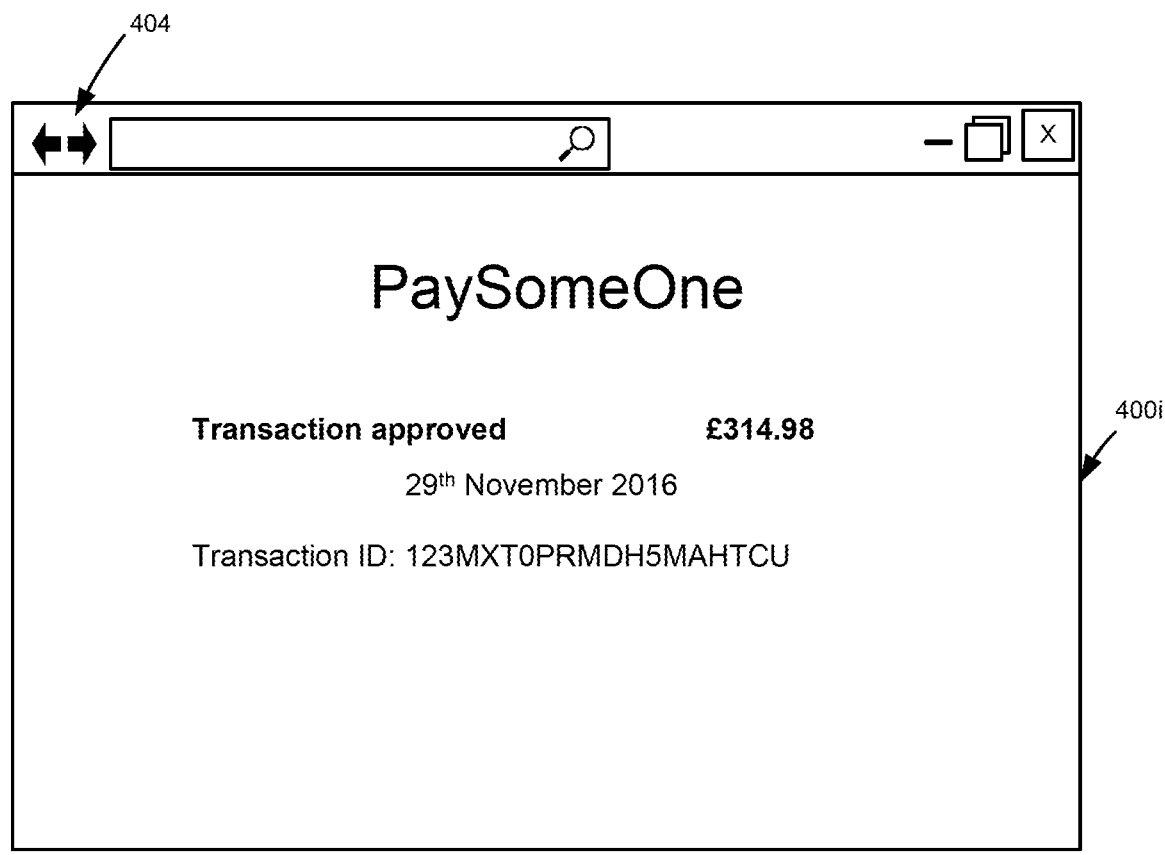
Figure 2J:

If the user is verified (step S24), a payment confirmation web page 400h as shown in FIG. 2h can be displayed for the user to confirm payment for the goods by selection of the confirm option 410.

In step S26, the payment is then processed by transmitting a request to authorize the transaction to the payment authority server by the transmission of transaction data to the payment authority server. In step S27, the payment authorization server 350 performs payment authorization and if it is not approved (step S28), a message is sent back to the user's device 1 for display by the browser 2 in step S25 to inform the user that the verification has failed. If the verification has failed, the transaction can be amended to a closed state but with no live transaction ID. This moves the products out of the basket since the basket represents products in an open transaction status. A transaction that is closed, with no live transaction ID identifies the transaction as a failed transaction. Alternatively, the aggregate transaction ID can include a transaction failed flag which is set when the transaction fails.

If the payment authorization has been approved (step S28), the approval is communicated to the aggregator server 100 and in step S29 the payment approval is recorded in the database 105 as part of the aggregate transaction data. In step S30, the web browser 2 of the user's device 1 receives and displays a payment approval notification as illustrated in the web pages 400i of FIG. 2i. The recorded approval in step S29 is also transmitted back to the aggregator server for the updating of the of quantity data for the purchased products in the database 105 in step S31 and for the updating of the status of the aggregate transaction from open to closed and the assigning of the live transaction ID from the payment authority server 350 to the aggregate transaction data in the database 105 in step S32. In step S33, the email server 107 of the aggregate server 100 then outputs an email of the transaction details to the user's device 1 and in step S34 the email client 3 of the user's device 1 receives and displays the notification of the successful transaction, as illustrated in the web page 400j of FIG. 2j. The email server 107 of the aggregate server 100 also outputs an email or API message of the transaction details to the merchants' computers 200a and 200b for the merchants involved in the aggregate transaction and the email client 205 or the application 203 of the merchants' computer 200a and 200b receives and displays the notification of the successful transaction (not shown in FIG. 3). This enables the merchants to update the inventory in their database.

The recordal of the approval of the transaction in step S29 also causes the payment gateway server to initiate payments to the merchants for the products and to the aggregator for the commission in step S35. In step S36, the payment Authority server 350 credits the merchant's accounts and the aggregators account accordingly.

Figure 4:
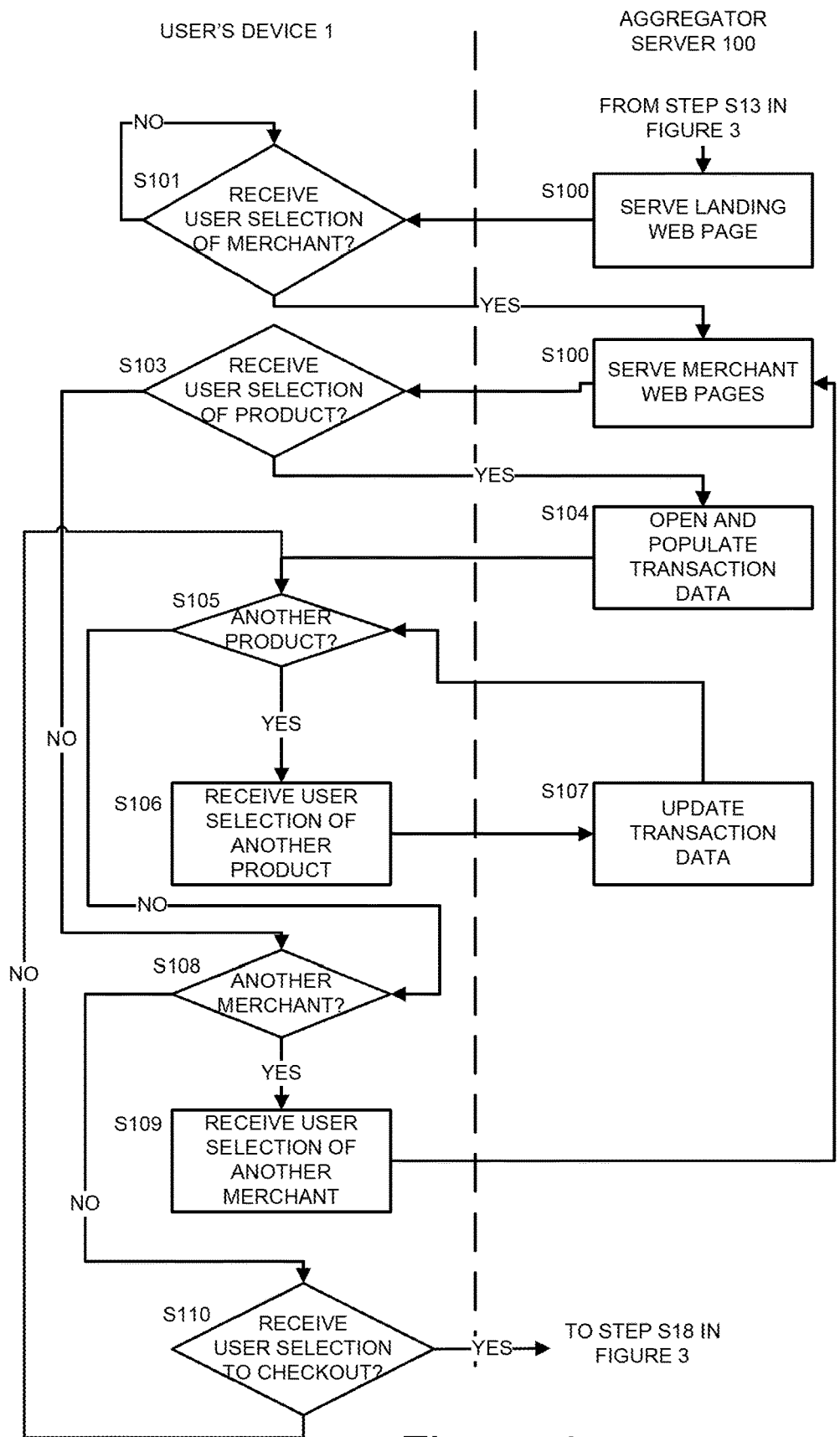
FIG. 4 is a flow diagram giving more details of steps S14 to S17 of the flow diagram of FIG. 3 according to one embodiment.

FIG. 4 is a flow diagram of the steps S14 to S17 of the flow diagram of FIG. 3 in more detail.

In step S100, a landing web page is served by the aggregator server 100 to the web browser 2 of the user's device 1 and in step S101, the web browser 2 of the user's device 1 waits to receive a user's selection of a merchant option (see FIG. 2a). When a user's selection of a merchant option is received, the aggregator server 100 services merchant web pages in step S100 and in step S103, the web browser 2 of the user's device 1 waits to receive a user's selection of a product (see FIG. 2c—note that the flow diagram of FIG. 4 skips the step of generating and displaying merchant product category options as illustrated in FIG. 2b).

When a user's selection of a product option is received in step S103, the aggregator server opens and populates transaction data in step S104 since this is the first product data added to the aggregate transaction. The process then waits in step S105 for the determination of whether or not the use selects another product (step S105). If the user selects another product, in step S106, the web browser 2 or the user's computer 1 received a user's selection of another product option and in step S107 the aggregator server updates the aggregate transaction data with the new transaction data. The process then returns to step S105 to determine whether another product is selected.

If in step S105, another product is not selected, in step S108 the process determines whether another merchant is selected. If so, in step S109 the web browser 2 of the user's device 1 received a selection of another merchant and the process returns to step S100 for the aggregator server 100 to serve merchant web pages for the newly selected merchant.

If, in step S108, another merchant is not selected, in step S110 the web browser 2 of the user's device determines whether a user selection to checkout has been received and if so, the process proceeds to step S18 in FIG. 3. If not, the process returns to step S105 to await a use selection of a product, or in step S108 of a merchant.

The updating of the stored product quantity in step S31 on the aggregator server can be used to inform merchants when the quantity falls below a threshold, which can be zero or any other merchants selected number. Also, the merchant interface can be used to inform the merchants of transactions each time a transaction occurs so that they can update their inventory and synchronize their inventory with the product quantity data stored on the merchant aggregator server. In this way, if the merchant's inventory is reduced via sales through other channels, or if the stock is replenished, the drop or increase in stock of products can be reflected accurately on the merchant aggregator server.

In this embodiment, fulfilment of the order for the products is delegated to the merchants to arrange for the delivery of the products from their warehouse, store or even directly from their suppliers. In an alternative embodiment, the aggregator service provider could assist the merchants with the order fulfilment, for example by sending instructions directly to a supplier to directly deliver a product to a customer.

In one embodiment, where the product update step S31 indicates that the product is not available i.e. the product quantity has reached zero, the aggregator server can enable the user to enter a request to be notified when the stock is replenished and the product is available for sale from the merchant again. The user can request the notification as an email or text for example and the aggregator server can in one embodiment send an instruction to the merchant computer e.g. by email or by the API, to instruct the merchant to notify the user when the product is back in stock. In an alternative embodiment, the aggregator server can fulfil the function of notifying the user when the product quantity on the aggregator server is updated by the merchant at a later date.

The process of embodiments of the invention thus enables users to make multiple purchases of products from multiple merchants by selecting to visit each merchant's web site or web pages hosted on an aggregator server and then making a single payment for all of the products using a third party payment service.

In embodiments, the aggregator service provider need not take any responsibility for the payment and is not required to authorize payments. It provides a merchant aggregator service by hosting merchant web pages in a single web site with a landing page starting with options to visit each merchant web site hosted by the aggregator service. Thus, the landing page can be likened to visiting a shopping mall, where a user can select to visit each merchant in turn to select to buy products. In embodiments, the user however need only pay once for all the products selected for purchase using a common single aggregated transaction process facilitated by the aggregator service provider.

In embodiments, although the interface to the user has been described as web pages, any suitable interface technology could be employed. In one embodiment, the interface to display merchant options could be output as a virtual shopping mall, though which a user can navigate to select a merchant. The product selections for a merchant could in this embodiment be output as products selectable by navigating within a virtual version of the merchant's store.

Basic Computing Device

Figure 5:
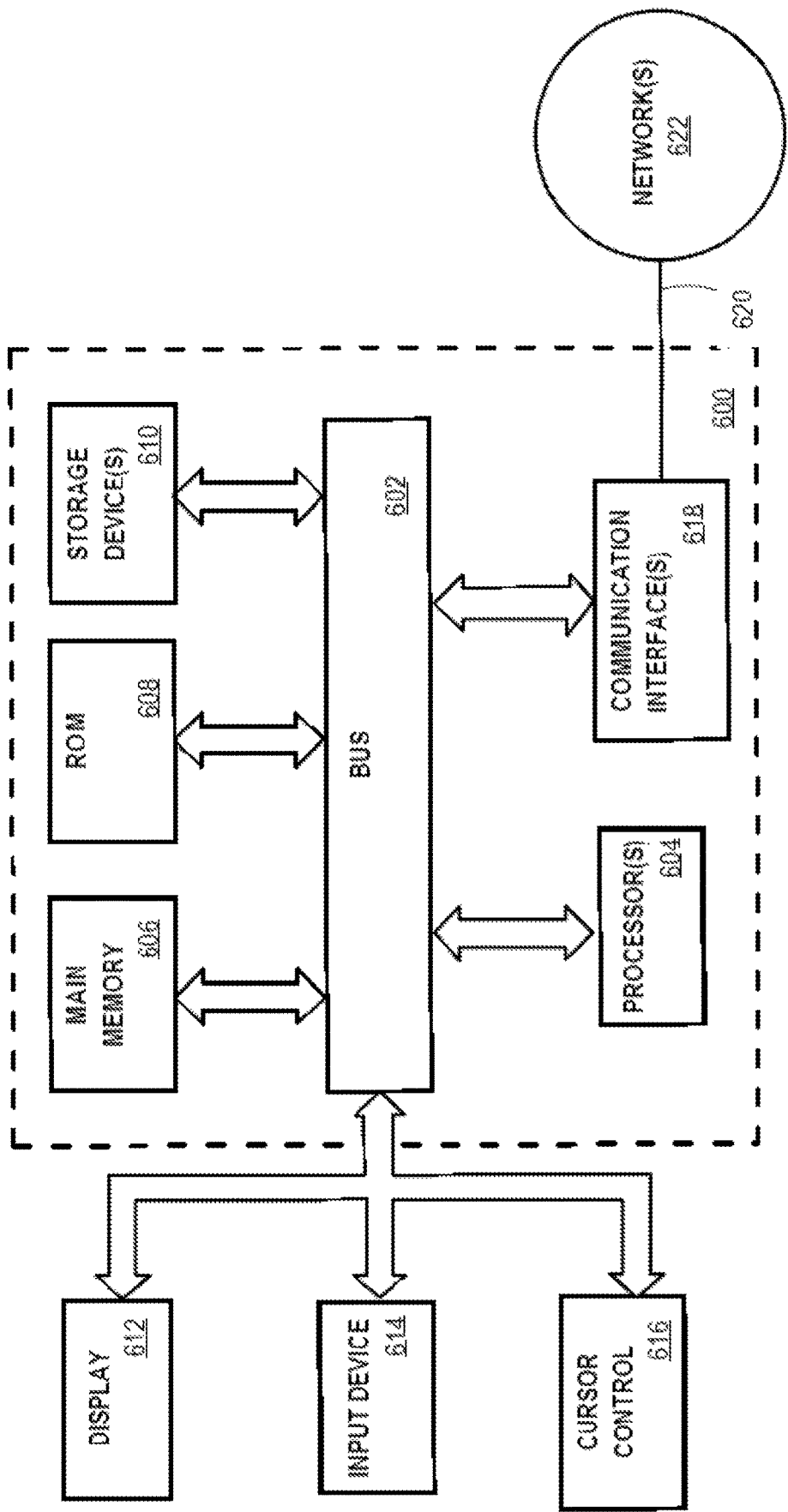
FIG. 5 is a schematic diagram of a basic computing device for use in one embodiment.

FIG. 5 is a block diagram that illustrates a basic computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

The computing device 600 can comprise any of the servers or the user device as illustrated in FIG. 1 for example.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices

610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, cursor or touch screen direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Other input device embodiments include an audio or speech recognition input module to recognize audio input such as speech, a visual input device capable of recognizing gestures by a user, and a keyboard.

While in some configurations, such as the configuration depicted in FIG. 5, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

In addition to or in place of the display 612 any other form of user output device can be sued such as an audio output device or a tactile (vibrational) output device.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610 or a transmission medium. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606.

Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications. A machine-readable medium carrying instructions in the form of code can comprise a non-transient storage medium and a transmission medium.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer or to data equipment operated by an Internet Service Provider (ISP). ISP in turn provides data communication services through the world wide packet data communication network now commonly referred to as the "Internet". Local network(s) 622 and Internet use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server might transmit a requested code for an application program through Internet, ISP, local network(s) 622 and communication interface(s) 618.

The received code may be executed by processor 604 as it is received, and/or stored in storage device 610, or other non-volatile storage for later execution.

One aspect provides a non-transient storage medium storing code for execution by a processor of a machine to carry out the method. Embodiments can be implemented in programmable digital logic that implements computer code. The code can be supplied to the programmable logic, such as a processor or microprocessor, on a storage medium. One such embodiment is a non-transitory storage medium that stores the code, such as a solid-state memory, magnetic media (hard disk drive), or optical media (Compact disc (CD) or digital versatile disc (DVD)).

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. An electronic product transaction method at a merchant aggregator server operated by a merchant aggregator service provider, the method comprising:
   generating and outputting an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server;
   receiving, from the user, a selection of a plurality of merchant options and a plurality of product options for the plurality of merchants using the interfaces for the purchase of the products; and
   generating and outputting a merchant interface to receive product data from the merchants to generate the product options for the merchant option for each merchant, including receiving code from the merchants to generate interfaces for at least one of the merchant options and the product options on the merchant aggregator server, and modifying the code to any links and functions in the code to operate on the merchant aggregator server.

2. An electronic product transaction method according to claim 1, wherein the code is modified to ensure that any navigation links do not allow navigation away from interfaces hosted by the merchant aggregator server.

3. An electronic product transaction method according to claim 1, wherein the code comprises web page code corresponding to web pages hosted by the merchant's web servers and the interfaces comprise web pages.

4. An electronic product transaction method according to claim 1, wherein the transaction data includes data on commission payable to the merchant aggregator service provider, and the method further includes:
   receiving an instruction from the user to pay for the selected products; and
   transmitting the transaction data to a remote payment server to authorize and make payments for the products from the user to the plurality of merchants and payment of the commission to the merchant aggregator service provider.

5. An electronic product transaction method according to claim 1, wherein the merchant interface is provided by an API on the merchant aggregator server, to which an application on a merchant server connects.

6. An electronic product transaction method according to claim 1, wherein the selections and instruction received from the user include speech and/or gesture control instructions.

7. An electronic product transaction method according to claim 4, including receiving an authorization for the transaction from the payment server, and updating the status of the transaction from open to closed in response to receipt of the authorization.

8. An electronic product transaction method according to claim 1, wherein the information on the product offered for sale, rent or hire by each merchant includes a quantity of the product available from the merchant, and including updating the quantity of the product available from the merchant.

9. An electronic product transaction method according to claim 4, including notifying a merchant server for each of the plurality of merchants of the quantity to update inventory at the merchant.

10. An electronic product transaction method according to claim 1, including notifying a merchant server for each of the plurality of merchants of the transaction data to update inventory data at the merchant server.

11. A merchant aggregator server operated by a merchant aggregator service provider, the merchant aggregator server comprising:
    at least one processor; and
    a memory storing instructions, which instructions being executable by the at least one processor to:
       generate and output an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server;
       receive, from the user, a selection of a plurality of merchant options and a plurality of product options for the plurality of merchants using the interfaces for the purchase of the products; and
       generate and output a merchant interface to receive product data from the merchants to generate the product options for the merchant option for each merchant, including receiving code from the merchants to generate interfaces for at least one of the merchant options and the product options on the merchant aggregator server, and modifying the code to any links and functions in the code to operate on the merchant aggregator server.

12. A merchant aggregator server according to claim 11, wherein the instructions include instructions that are executable by the at least one processor to modify the code to ensure that any navigation links do not allow navigation away from interfaces hosted by the merchant aggregator server.

13. A merchant aggregator server according to claim 11, wherein the code comprises web page code corresponding to web pages hosted by the merchant's web servers and the interfaces comprise web pages.

14. A merchant aggregator server according to claim 11, wherein the transaction data includes data on commission payable to the merchant aggregator service provider, and the instructions include instructions that are executable by the at least one processor to:
    receive an instruction from the user to pay for the selected products; and
    transmit the transaction data to a remote payment server to authorize and make payments for the products from the user to the plurality of merchants and payment of the commission to the merchant aggregator service provider.

15. A merchant aggregator server according to claim 11, wherein the merchant interface is provided by an API on the merchant aggregator server, to which an application on a merchant server connects.

16. A merchant aggregator server according to claim 11, wherein the selections and instruction received from the user include speech and/or gesture control instructions.

17. A merchant aggregator server according to claim 14, wherein the instructions include instructions that are executable by the at least one processor to receive an authorization for the transaction from the payment server, and update the status of the transaction from open to closed in response to receipt of the authorization.

18. A merchant aggregator server according to claim 11, wherein the information on the product offered for sale, rent or hire by each merchant includes a quantity of the product available from the merchant, and the instructions include instructions that are executable by the at least one processor to update the quantity of the product available from the merchant.

19. A merchant aggregator server according to claim 14, wherein the instructions include instructions that are executable by the at least one processor to notify a merchant server for each of the plurality of merchants of the quantity to update inventory at the merchant.

20. A merchant aggregator server according to claim 11, wherein the instructions include instructions that are executable by the at least one processor to notify a merchant server for each of the plurality of merchants of the transaction data to update inventory data at the merchant server.

21. A non-transitory storage medium storing processor executable code, which, when executed by a processor, causes the processor to:
    generate and output an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server;
    receive, from the user, a selection of a plurality of merchant options and a plurality of product options for the plurality of merchants using the interfaces for the purchase of the products; and
    generate and output a merchant interface to receive product data from the merchants to generate the product options for the merchant option for each merchant, including receiving code from the merchants to generate interfaces for at least one of the merchant options and the product options on the merchant aggregator server, and modifying the code to any links and functions in the code to operate on the merchant aggregator server.

22. A non-transitory storage medium according to claim 21, wherein the instructions include instructions that are executable by the at least one processor to modify the code to ensure that any navigation links do not allow navigation away from interfaces hosted by the merchant aggregator server.

23. A non-transitory storage medium according to claim 21, wherein the code comprises web page code corresponding to web pages hosted by the merchant's web servers and the interfaces comprise web pages.

24. A non-transitory storage medium according to claim 21, wherein the transaction data includes data on commission payable to the merchant aggregator service provider, and the instructions include instructions that are executable by the at least one processor to:
    receive an instruction from the user to pay for the selected products; and
    transmit the transaction data to a remote payment server to authorize and make payments for the products from the user to the plurality of merchants and payment of the commission to the merchant aggregator service provider.

25. A non-transitory storage medium according to claim 21, wherein the merchant interface is provided by an API on the merchant aggregator server, to which an application on a merchant server connects.

26. A non-transitory storage medium according to claim 21, wherein the selections and instruction received from the user include speech and/or gesture control instructions.

27. A non-transitory storage medium according to claim 24, wherein the instructions include instructions that are executable by the at least one processor to receive an authorization for the transaction from the payment server, and update the status of the transaction from open to closed in response to receipt of the authorization.

28. A non-transitory storage medium according to claim 21, wherein the information on the product offered for sale, rent or hire by each merchant includes a quantity of the product available from the merchant, and the instructions include instructions that are executable by the at least one processor to update the quantity of the product available from the merchant.

29. A non-transitory storage medium according to claim 24, wherein the instructions include instructions that are executable by the at least one processor to notify a merchant server for each of the plurality of merchants of the quantity to update inventory at the merchant.

30. A non-transitory storage medium according to claim 21, wherein the instructions include instructions that are executable by the at least one processor to notify a merchant server for each of the plurality of merchants of the transaction data to update inventory data at the merchant server.

31. An electronic product transaction method at a merchant aggregator server operated by a merchant aggregator service provider, the method comprising:
    generating and outputting an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server;
    receiving, from the user, a selection of a plurality of merchant options and a plurality of product options for the plurality of merchants using the interfaces for the purchase of the products; and
    generating and outputting a merchant interface to receive product data from the merchants to generate the product options for the merchant option for each merchant, including receiving selections of templates using the merchant interface and generating interfaces for the product options using the selected templates.

32. An electronic product transaction method according to claim 31, wherein the transaction data includes data on commission payable to the merchant aggregator service provider, and the method further includes:
receiving an instruction from the user to pay for the selected products; and
transmitting the transaction data to a remote payment server to authorize and make payments for the products from the user to the plurality of merchants and payment of the commission to the merchant aggregator service provider.

33. An electronic product transaction method according to claim 31, wherein the merchant interface is provided by an API on the merchant aggregator server, to which an application on a merchant server connects.

34. An electronic product transaction method according to claim 31, wherein the selections and instruction received from the user include speech and/or gesture control instructions.

35. An electronic product transaction method according to claim 34, including receiving an authorization for the transaction from the payment server, and updating the status of the transaction from open to closed in response to receipt of the authorization.

36. An electronic product transaction method according to claim 31, wherein the information on the product offered for sale, rent or hire by each merchant includes a quantity of the product available from the merchant, and including updating the quantity of the product available from the merchant.

37. An electronic product transaction method according to claim 34, including notifying a merchant server for each of the plurality of merchants of the quantity to update inventory at the merchant.

38. An electronic product transaction method according to claim 31, including notifying a merchant server for each of the plurality of merchants of the transaction data to update inventory data at the merchant server.

39. A merchant aggregator server operated by a merchant aggregator service provider, the merchant aggregator server comprising:
at least one processor; and
a memory storing instructions, which instructions being executable by the at least one processor to:
generate and output an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server;
receive, from the user, a selection of a plurality of merchant options and a plurality of product options for the plurality of merchants using the interfaces for the purchase of the products; and
generate and output a merchant interface to receive product data from the merchants to generate the product options for the merchant option for each merchant, including receiving selections of templates using the merchant interface and generating interfaces for the product options using the selected templates.

40. A merchant aggregator server according to claim 39, wherein the transaction data includes data on commission payable to the merchant aggregator service provider, and the instructions include instructions that are executable by the at least one processor to:
receive an instruction from the user to pay for the selected products; and
transmit the transaction data to a remote payment server to authorize and make payments for the products from the user to the plurality of merchants and payment of the commission to the merchant aggregator service provider.

41. A merchant aggregator server according to claim 39, wherein the merchant interface is provided by an API on the merchant aggregator server, to which an application on a merchant server connects.

42. A merchant aggregator server according to claim 39, wherein the selections and instruction received from the user include speech and/or gesture control instructions.

43. A merchant aggregator server according to claim 40, wherein the instructions include instructions that are executable by the at least one processor to receive an authorization for the transaction from the payment server, and update the status of the transaction from open to closed in response to receipt of the authorization.

44. A merchant aggregator server according to claim 39, wherein the information on the product offered for sale, rent or hire by each merchant includes a quantity of the product available from the merchant, and the instructions include instructions that are executable by the at least one processor to update the quantity of the product available from the merchant.

45. A merchant aggregator server according to claim 40, wherein the instructions include instructions that are executable by the at least one processor to notify a merchant server for each of the plurality of merchants of the quantity to update inventory at the merchant.

46. A merchant aggregator server according to claim 39, wherein the instructions include instructions that are executable by the at least one processor to notify a merchant server for each of the plurality of merchants of the transaction data to update inventory data at the merchant server.

47. A non-transitory storage medium storing processor executable code, which, when executed by a processor, causes the processor to:
generate and output an interface to a user, the interface comprising a plurality of selectable merchant options, each merchant option comprising a link to an interface for a plurality of selectable product options for a respective merchant, each product option comprising information on a product offered for sale, rent or hire by the respective merchant, wherein the interfaces are hosted by the merchant aggregator server;
receive, from the user, a selection of a plurality of merchant options and a plurality of product options for the plurality of merchants using the interfaces for the purchase of the products; and
generate and output a merchant interface to receive product data from the merchants to generate the product options for the merchant option for each merchant, including receiving selections of templates using the merchant interface and generating interfaces for the product options using the selected templates.

48. A non-transitory storage medium according to claim 47, wherein the transaction data includes data on commission payable to the merchant aggregator service provider, and the instructions include instructions that are executable by the at least one processor to:

receive an instruction from the user to pay for the selected products; and transmit the transaction data to a remote payment server to authorize and make payments for the products from the user to the plurality of merchants and payment of the commission to the merchant aggregator service provider.

49. A non-transitory storage medium according to claim 47, wherein the merchant interface is provided by an API on the merchant aggregator server, to which an application on a merchant server connects.

50. A non-transitory storage medium according to claim 47, wherein the selections and instruction received from the user include speech and/or gesture control instructions.

51. A non-transitory storage medium according to claim 48, wherein the instructions include instructions that are executable by the at least one processor to receive an authorization for the transaction from the payment server, and update the status of the transaction from open to closed in response to receipt of the authorization.

52. A non-transitory storage medium according to claim 47, wherein the information on the product offered for sale, rent or hire by each merchant includes a quantity of the product available from the merchant, and the instructions include instructions that are executable by the at least one processor to update the quantity of the product available from the merchant.

53. A non-transitory storage medium according to claim 48, wherein the instructions include instructions that are executable by the at least one processor to notify a merchant server for each of the plurality of merchants of the quantity to update inventory at the merchant.

54. A non-transitory storage medium according to claim 47, wherein the instructions include instructions that are executable by the at least one processor to notify a merchant server for each of the plurality of merchants of the transaction data to update inventory data at the merchant server.

\* \* \* \* \*